US005713013A

United States Patent [19]

Black

[11] Patent Number: 5,713,013
[45] Date of Patent: Jan. 27, 1998

[54] SYSTEM FOR ESTABLISHING AND ENFORCING MAXIMUM SIZE OF DIRECTORY BY PREVENTING THE SIZE OF THE DIRECTORY FROM EXCEEDING THE SET QUOTA SIZE OF THE DIRECTORY

[75] Inventor: Steven T. Black, Menlo Park, Calif.

[73] Assignee: Apple Computer, Inc., Cupertino, Calif.

[21] Appl. No.: 591,747

[22] Filed: Jan. 25, 1996

[51] Int. Cl.$^6$ .................................................. G06F 17/30
[52] U.S. Cl. .................................................. 395/602
[58] Field of Search ............ 395/200.01, 200.02, 395/200.05, 200.09, 600, 650, 700, 800, 427, 497.01, 497.02, 481, 200.08, 200.11, 601–602, 603, 604, 609, 610, 611, 613, 616–617, 619

[56] References Cited

U.S. PATENT DOCUMENTS

| 5,202,982 | 4/1993 | Gramlich et al. | 395/602 |
| 5,247,660 | 9/1993 | Ashcraft et al. | 395/621 |
| 5,390,318 | 2/1995 | Ramakrishnan | 395/485 |
| 5,410,691 | 4/1995 | Taylor | 395/611 |
| 5,459,863 | 10/1995 | Taylor | 395/610 |
| 5,504,873 | 4/1996 | Martin et al. | 395/438 |
| 5,504,892 | 4/1996 | Atsatt et al. | 395/614 |

OTHER PUBLICATIONS

"Journaling File Systems", by Baker, Steven, LAN Magazine, V9, n10, p. 559(9), Oct., 1994.
"Where Have All my Disk Blocks Gone?"., by Watson, Allen, Digital Review, V9, n1, p.20(1), Jan. 1992.
"Taking the Fear Out of File Management", by Junean, Lucie, Digital Review, V6, n28, p.41(2), Jul. 1989.
"Making Do With Short Disk Space", by Watson, Allen, Digital Review, v7, n37, p.23(1), Sep. 1990.
"Uniting File Systems", by Spector, Alfred, Unix Review, V7, n3, p. 61(10), Mar. 1989.
"Comparing Distributed File Systems", by Data Communications, Dec. 1987, p. 173, vol. 16, No. 13.
"The Frye Utilities for Networks", by Boyle, Padraic, PC Magazine, v12, n21, p.348(2), Dec. 7, 1993.
"Uniting file systems", Spector, Alfred, Unix Review, V7, n3, p.61(10), Mar. 1989.
"DiskAlarm: everybody out of the water", by Wong, William, Lan Technology, V8, n1, p.75(2), Jan. 1992.
"Administrators are crucial for successfully navigating LANs", PC Week, V5, n17, p.40(1), Apr. 26, 1988.
"DCE: Building the distributed future", Byte Jun. 1994, p. 125, vol. 19, No. 6.
"Netware volumes", by Danielle, Diane, PC Magazine, V14, n20, pNE28(1), Nov. 21, 1995.
"A brave, new Netware", by Kalman, Steve, LAN Magazine, v10, n5, p.158(6), May 1995.
"Netware 4.0", by Grant, David, LAN Magazine, v8, n7, p.138(8), Jul. 1993.

*Primary Examiner*—Moustafa M. Meky
*Attorney, Agent, or Firm*—Sawyer & Associates

[57] ABSTRACT

A system and method for establishing and enforcing a maximum size for a directory in a file server. The system and method includes setting a quota size for the directory, and in response to a request to write to the directory, determining if the size of the directory is less than the quota size. If the size of the directory is less than the quota, then it is determined if the write request will exceed the quota size. The system and method further includes processing the write request if the write request does not exceed the quota, thereby preventing the size of the directory from exceeding the set quota size.

17 Claims, 7 Drawing Sheets

SYSTEM FOR ESTABLISHING AND ENFORCING MAXIMUM SIZE OF DIRECTORY BY PREVENTING THE SIZE OF THE DIRECTORY FROM EXCEEDING THE SET QUOTA SIZE OF THE DIRECTORY

FIELD OF THE INVENTION

The present invention relates generally to computer network systems, and more particularly to a method and system for establishing and enforcing a maximum size for a directory in a file server.

BACKGROUND OF THE INVENTION

In the computing industry, it is quite common to transfer data and commands between a plurality of data processing devices, such as computers, printers, displays, terminals, and other network resources. Interconnection of computers and other peripheral devices principally developed in the early 1970's with the advent of computer networking systems which permitted the distribution of access to computing resources beyond the immediate proximity of a mainframe computer.

Recently, "local area networks" (LANs) have been developed which allow transfer of data between a localized set of computing and peripheral devices, typically in the same geographical area such as one building or a plurality of buildings closely situated together. Examples of such LANs may be found in U.S. Pat. Nos. 4,063,220, 4,661,902, and 4,689,786.

In the AppleTalk (R) (a trademark of Apple Computer, Inc.) network system, each "node" or computer, printer, peripheral, and other network resources share resources with a file server. The file server includes three main AppleTalk protocols called the AppleTalk Filing Protocol (AFP), AppleTalk Session Protocol (ASP), and the operating system of the file server includes the AppleTalk Transaction Protocol (ATP). The AFP is a protocol dealing with issues that are file system related, and the ASP is a protocol for maintaining network sessions between the file server and the network entities.

A session is opened once an entity establishes communication with the server, and the ASP keeps information about the entity in a session object. After a session is created, the AFP uses the ASP to receive file system requests from network entities and to send responses back to the entities. The request and responses may be partitioned into smaller data packets and the ASP uses the ATP to send and receive these data packets over the network.

The AFP is the protocol that allows users to access data in the file server, which typically includes one or more large-capacity disks. Each disk attached to the file server usually contains one or more volumes that are visible to the other entities on the network through the AFP.

An AFP volume is structured in one of two ways: flat or hierarchical. A flat volume contains only one directory, called the root, which in turn, contains files. Hierarchical volumes contain directories arranged in a branching hierarchy of sub-directories and files, also known as a tree structure.

For security reasons, each user of the file server is granted access to only certain directories. Each directory, however, may be accessed by many users. When users reach the capacity of a volume, write access to that volume and all directories within the volume may be blocked. As an example, assume that a volume has a maximum capacity of 100 MB, and that 20 MB are filled. A user could potentially limit access to that volume by other users by writing a 80 MB file into that volume.

The conventional solution to this problem is to grant to each user of the file system what is referred to as user quota, which defines the maximum amount of data that the user may store in the file server. Thus, if a user has a 10 MB user quota, then the user may freely write up to 10 MB of data on any directory that the user has write access to in the file server. User quotas are used to ensure that users do not expend more than their allocated share of the file server's resources.

Although user quotas provide limited access to directories, the use of user quota has disadvantages. One disadvantage is that user quotas must be distributed to users and managed similar to many other parameters in the file server. This may not be a problem in a large LAN having hundreds of network entities, because large LANs are typically managed by one or more professional network-administrators who provide and maintain access to the data on the file server.

However, the administration of network parameters, such as user quotas, in smaller networks, called workgroups, is a larger problem because workgroup type networks are typically managed by only part-time non-professional administrators. Workgroups are typically installed in small environments that have less than fifty network entities. An example of a workgroup is a network of student computers in a grade-school class, where the network is administered by a grade-school teacher. Another example may be a workgroup that's installed in a small-office of less than ten people, where the network of office computers is administered by a secretary/file administrator, for instance.

Allocating user quotas can be burdensome to part-time workgroup administrators. Workgroup administrators must assign appropriate user quotas based on the current system configuration and the number of users, and then change the quotas as users are added and dropped from the system. Such duties are typically performed with limited or no training.

What is needed therefore is a system and method for establishing and enforcing user storage limits in a file server without requiring constant oversight by the administrator. The present invention addresses such a need.

SUMMARY OF THE INVENTION

The present invention provides a system and method for establishing and enforcing a maximum size for a directory. The system and method includes setting a quota size for the directory, and in response to a request to write to the directory, determining if the size of the directory is less than the quota size. If the size of the directory is less than the quota, then it is determined if the write request will exceed the quota size. The system and method further includes processing the write request if the write request does not exceed the quota, thereby preventing the size of the directory from exceeding the set quota size. According to the directory quota system and method disclosed herein, workgroup administrators may ration how a hard drive is allocated and used by clients without requiring constant oversight.

DESCRIPTION OF THE INVENTION

The present invention relates to an improvement in a sewer utilized in a network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
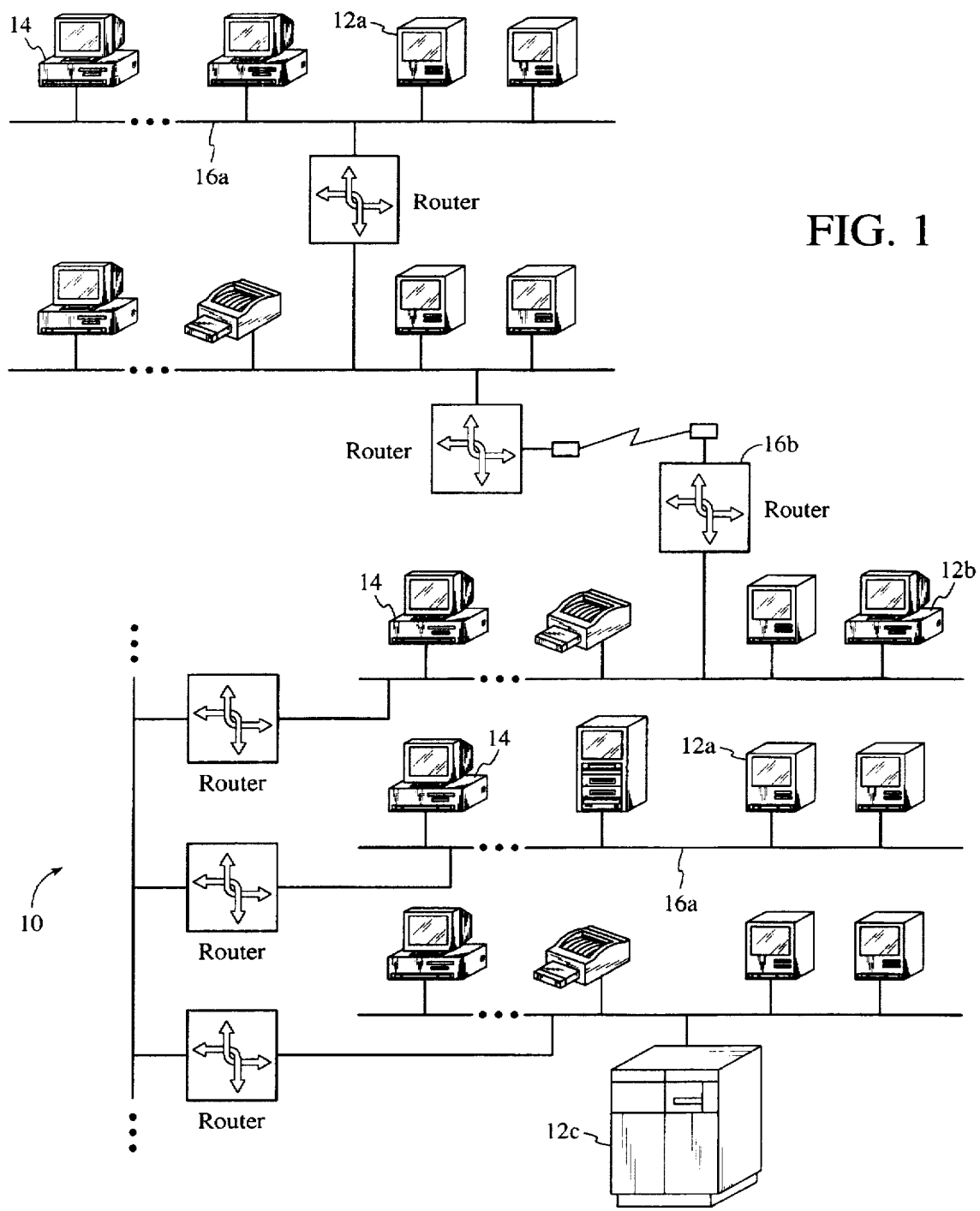
FIG. 1 is a block diagram illustrating a computer network system.

FIG. 1 is a block diagram illustrating a computer network environment in which the present invention resides. The network 10 may include a plurality of computers, such as personal computers 12a, minicomputers 12b, and mainframes 12c, and server devices 14, such as a file and printer servers. For the purposes of this specification, all data processing and peripheral devices which are coupled to the network are collectively referred to as entities 12. The entities 12 may be connected through a variety of network connection devices 16 such as cables 16a and routers 16b, for example. The purpose of the network 10 is to eliminate access barriers resulting from physical separation between the various entities 12 and to share the resources the entities 12 contain.

Figure 2:
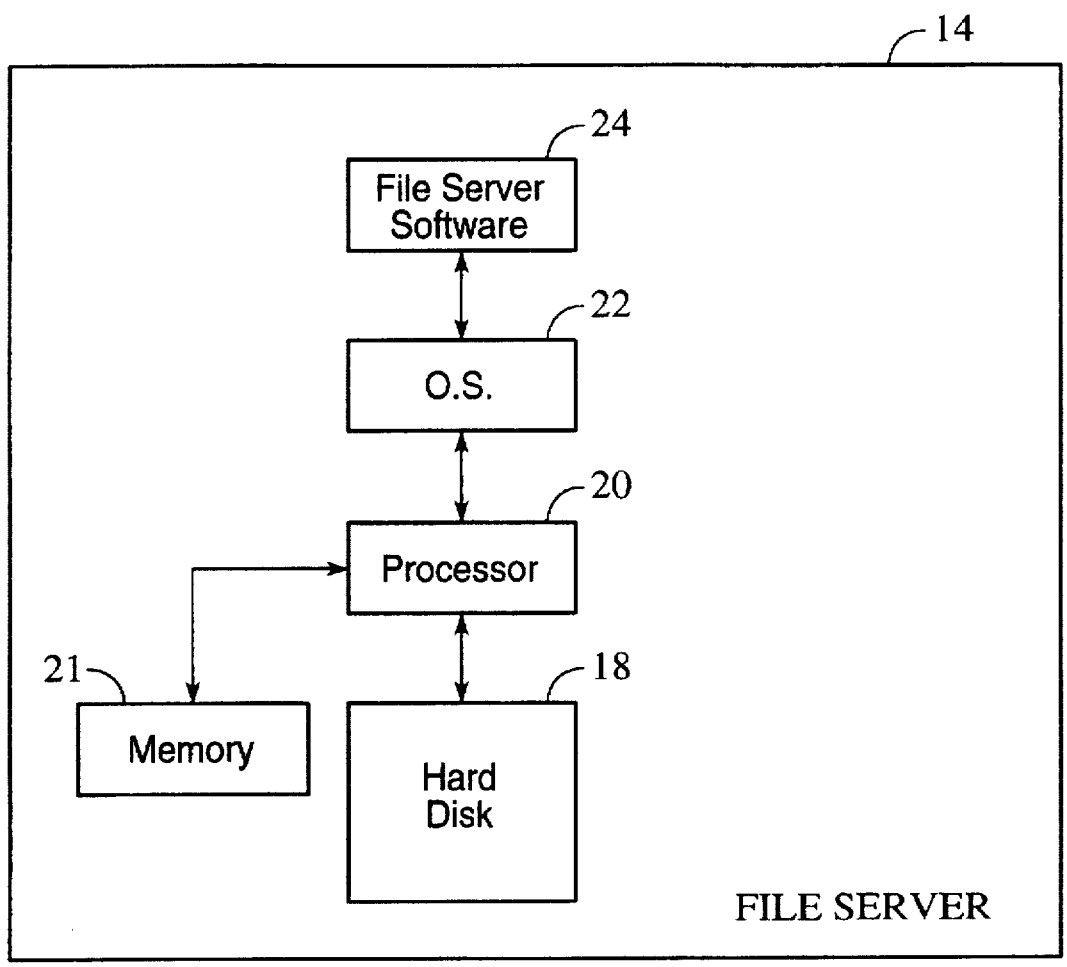
FIG. 2 is a block diagram of a sewer in which the present invention is implemented.

FIG. 2 is a block diagram of a server 14 in which the present invention is implemented. The server includes one or more hard disk drives 18, a processor 20, memory 21, an operating system 22, and file server software 24. The file server software 24 enables a computer to become a file server 14 for one or more entities 12, on the network.

In a preferred embodiment, the file server software 24 is Appleshare File Server software, which utilizes a protocol architecture called AppleTalk. Both Appleshare and AppleTalk were designed and developed by Apple Computer, Cupertino, Calif. Also in a preferred embodiment, the processor 20 is a PowerPC processor, and the operating system 22 is a Macintosh Operating System, such as System 7.5, for example.

Figure 3:
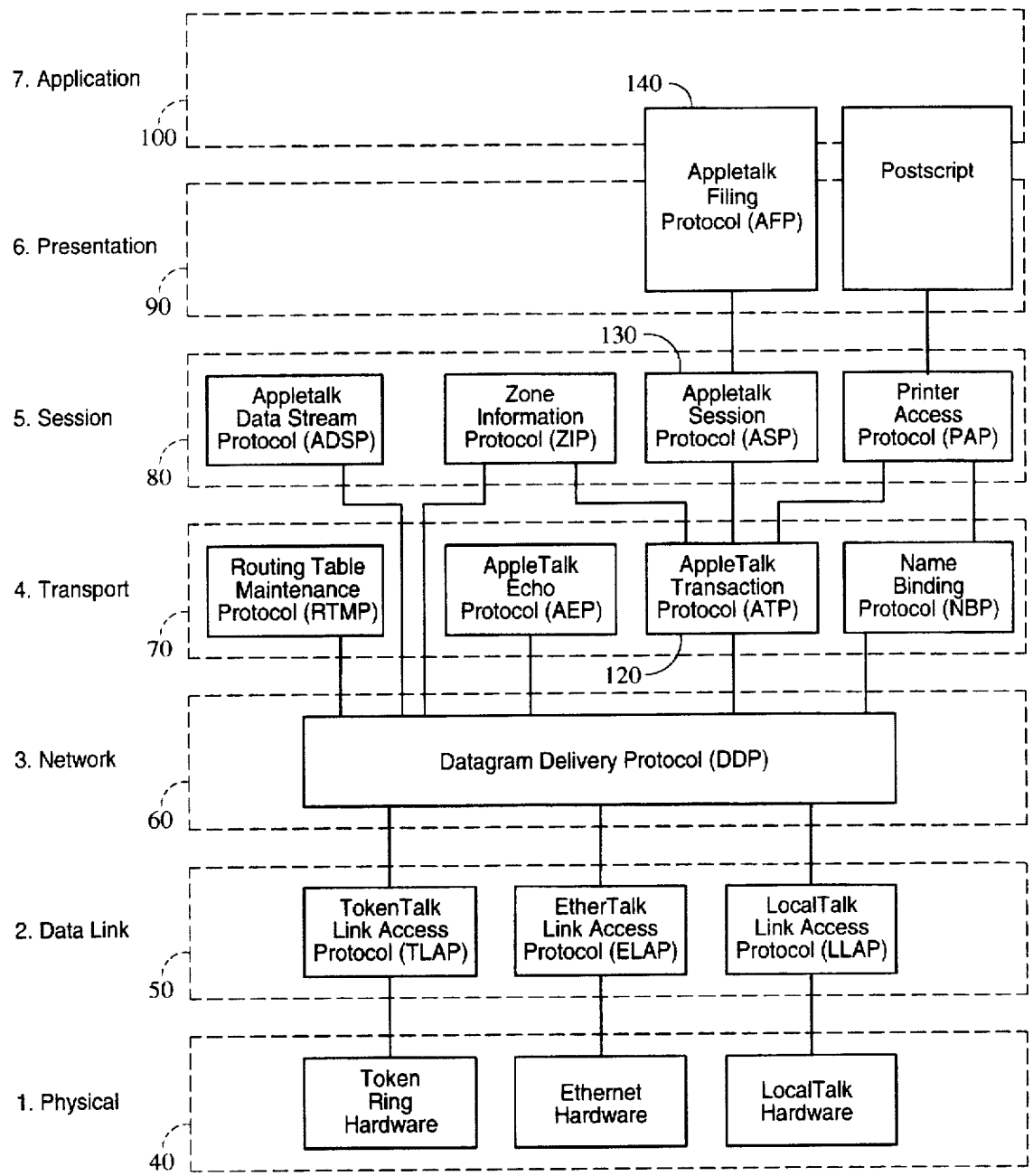
FIG. 3 is a diagram illustrating the AppleTalk protocol architecture within the framework of the Open Systems Interconnection (OSI) reference model.

Referring to FIG. 3, the AppleTalk protocol architecture is shown within the framework of the Open Systems Interconnection (OSI) reference model developed by the International Standards Organization (ISO). The OSI model defines the concepts of a protocol and a service interface that includes seven layers: Physical 40, Data Link 50, Network 60, Transport 70, Session 80, Presentation 90, and Application 100. The layers allow data packets to be transmitted from a variety of hardware to another, and from one process (socket) to another. Each layer functions as a separate process or filter that either appends protocol information onto existing data packets transmitted in the network 10, or routes appropriate data packets through the network 10 depending on the type of packet and the particular layer in which the packet resides.

Referring to both FIGS. 1 and 3, the higher-level network services in both OSI and AppleTalk are built using the model of an entity 12 issuing a sequence of commands to a server 14. The server 14 carries out the commands and then reports the results to the entity 12. The present invention relates to the interaction between the AppleTalk Session Protocol (ASP) 130 and the AppleTalk Filing Protocol (AFP) 140. The AppleTalk protocol is described in further detail in *Inside AppleTalk* (R), by Gursharan Sidhu, Richard F. Andrews, and Alan B. Oppenheimer (2d Ed. 1990), published by Addision-Wesley, which is herein incorporated by reference.

The purpose of the AFP 140 is to allow the server to share files with the entities 12 on the network 10 through network commands. The ASP 130 serves the AFP 140 and is used to establish a connection, called a session, between an entity 12 and the server 14. A command from an entity 12 to a server 14 may require several data packets to be sent across the network 10. The AppleTalk Transaction Protocol (ATP) 120 provides the ASP 130 with a transaction service for sending and receiving packets across the network 10.

Typically, packets are sent and received between an entity 12 and the server 14, but packets may also be sent and received between software processes. Each entity 12 in the network 10 may include one or more software processes. One software process can request that another software process perform a higher-level function and then report the outcome. A software process that makes use of the services of another software process is called a client. This interaction between a requesting client and a responding client is called a transaction, and is handled by the ATP 120. For purposes of this discussion, when an entity 12 on the network initiates a transaction with the file server 14, the entity 12 is the requesting client and the file server 14 the responding client of ATP 120.

In order to send and receive transactions, a client must first create an addressable entity on the network called a socket. This is accomplished by both the requesting client and the responding server making a call to the ATP 120 to open a respective socket. The socket opened at the responding entity is called a transaction listening socket. Both the requesting client and the responding server can have multiple sockets for receiving/transmitting transactions, where each socket is identified by a socket number.

The requesting client initiates a transaction by issuing a call to the ATP 120 and supplying the parameters of the request. Once the transaction request packet is received by the socket of the responding server, the transaction request is serviced and the responding server returns a transaction response packet reporting the transaction outcome.

Before an entity 12 can send transaction requests to a server 14, a session must be established between them. Whereas the ATP 120 handles individual transactions, the ASP 130 establishes and maintains sessions between each entity 12 and the server 14. For the duration of the session, the entity 12 can send a sequence of commands to the server 14. The ASP 130 ensures that the commands are delivered without duplication in the same order as they were sent, and sends the results of the commands back to the entity 12.

Figure 4:
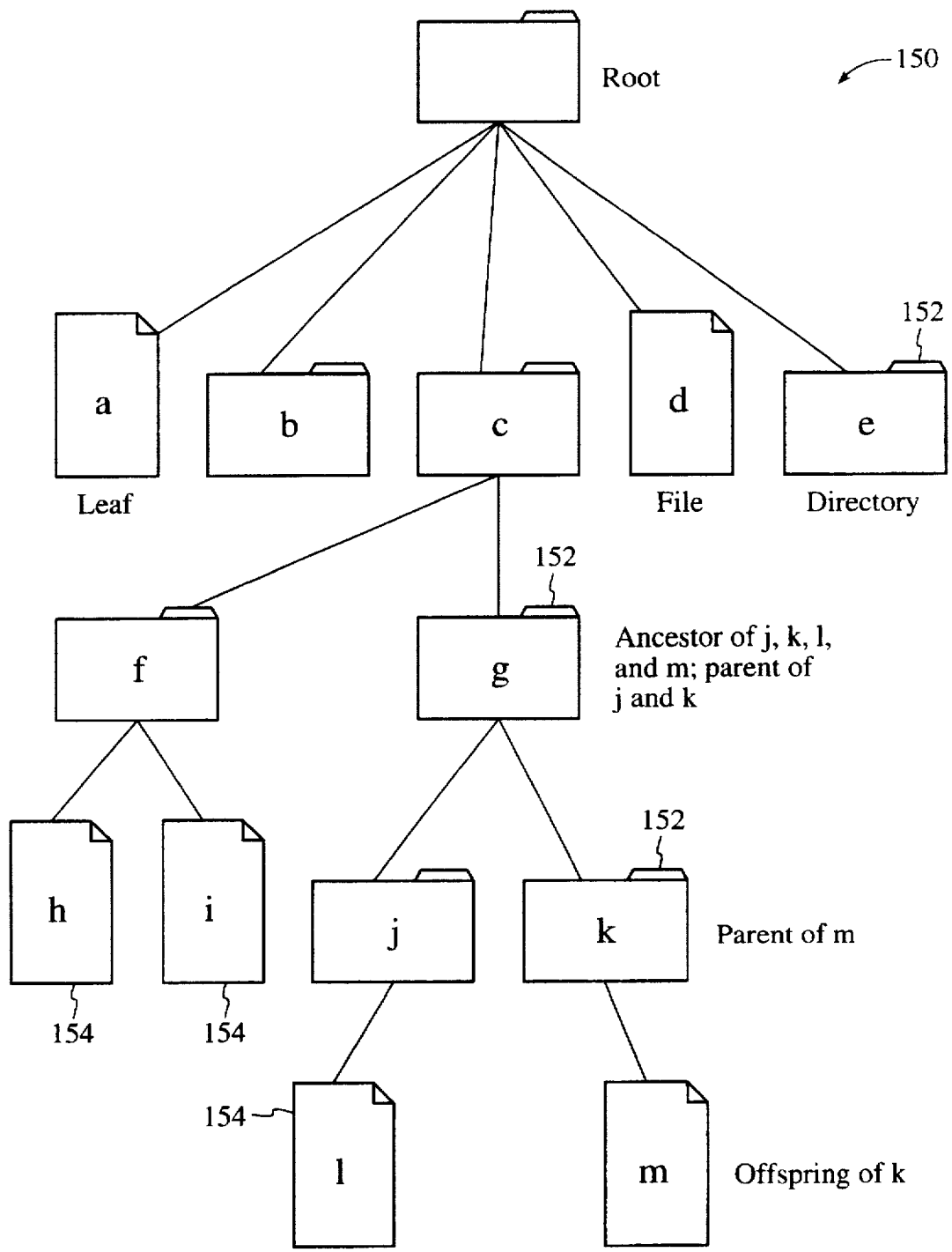
FIG. 4 is a block diagram showing a hierarchical volume contained within a disk.

Referring now to FIG. 4, a block diagram is shown of a hierarchical volume 150 contained within the disk 18 of FIG. 2. The hierarchical volume 150 contains at least one directory arranged in a tree structure of directories 152 and files 154, where the directories 152 and files 154 branch from a base directory known as the root.

The directories 152 and files 154 located at terminal nodes on the tree are leafs, and directories 152 that branch to other directories 152 and files 154 have a parent/child relationship, as shown. When a client requests a file 154 from a particular directory 152 in the volume 150, an AFP call is made in the file server 14 that makes its way from the root to the destination node. The nodes along that path are called ancestors of the destination node, and the destination node is called the descendant of each of its ancestors.

To help evenly distribute storage access to the directories 152 among many users, and to prevent a user from exceeding the storage capacity of the file server 14, conventional methods have assigned a user quota to each user to define the maximum amount of data that the user may store in the file server 14.

Figure 5:
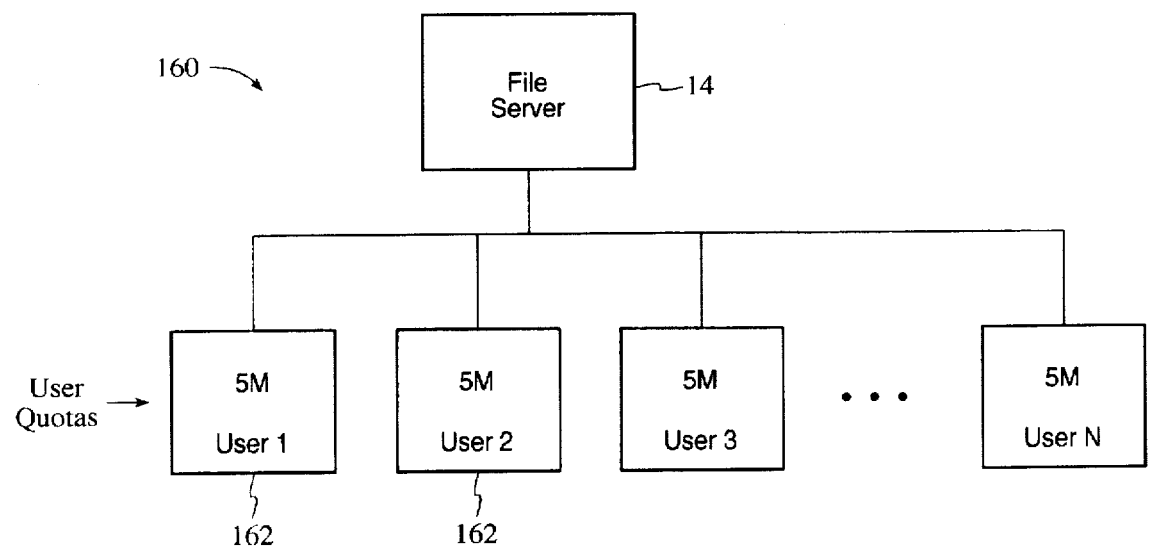
FIG. 5 is a diagram illustrating an example of a prior art workgroup in which each user connected to the file server is assigned a user quota.

FIG. 5 is a diagram illustrating an example of a prior art workgroup in which each user connected to the file server is assigned a user quota. Assuming the workgroup 160 was located in a grade school, then a teacher/administrator would assign each student/user 162 in the workgroup a user quota that limits how much data a respective student can store in the file server 14. In the example shown, a user quota of 5 MB has been assigned to each student/user 162. Thus, once a student had stored 5 MB worth of data, all future requests by that student to write data generates an error message and is denied by the file server 14.

Since a user quota for a particular user exists across all the storage devices of the file server 14, the user is forced to determine from which directory to delete files from before the file server 14 performs the user's write request. In addition, user quotas require workgroup administrators to perform complicated actions, such as setting up special privileges in order to restrain a user's access to the resources of the file server 14.

The present invention provides a method and system for assigning quotas to directories, rather than users, so that workgroup administrators may establish and enforce maximum directory sizes without constant oversite. To more particularly illustrate the present invention, refer now to FIG. 6 depicting a block diagram of one embodiment of such a system.

Figure 6:
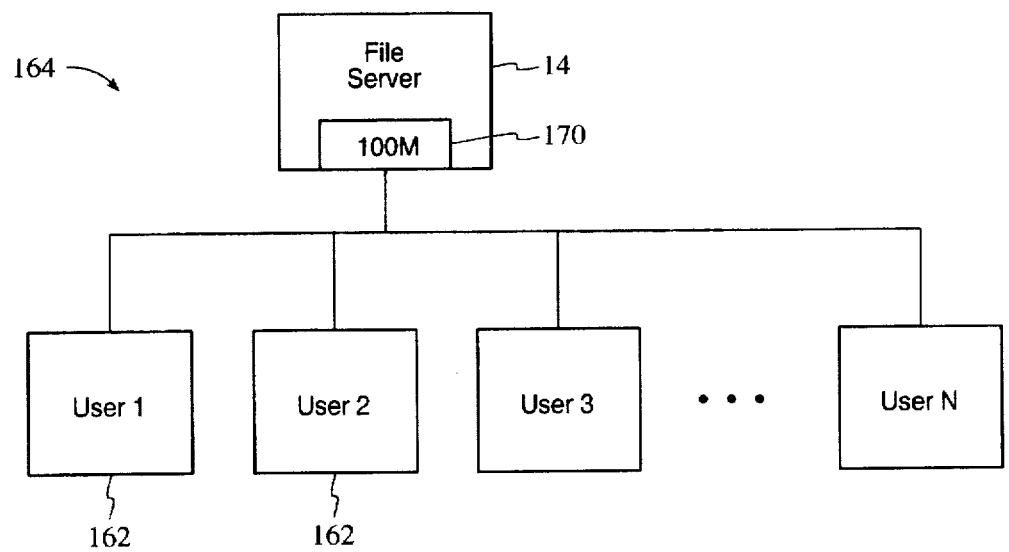
FIG. 6 is a diagram illustrating an example of a workgroup in which a directory within the file server is assigned a directory quota in accordance with the present invention.

FIG. 6 is a diagram illustrating an example of a workgroup 164 in which a directory within the file server 14 is assigned a directory quota 170 in accordance with the present invention. Instead of user quotas assigned to each user in the workgroup 164, the present invention enables administrators to set assign a maximum size, called a directory quota 170, to a directory 152 within the file server 14.

Figure 7:
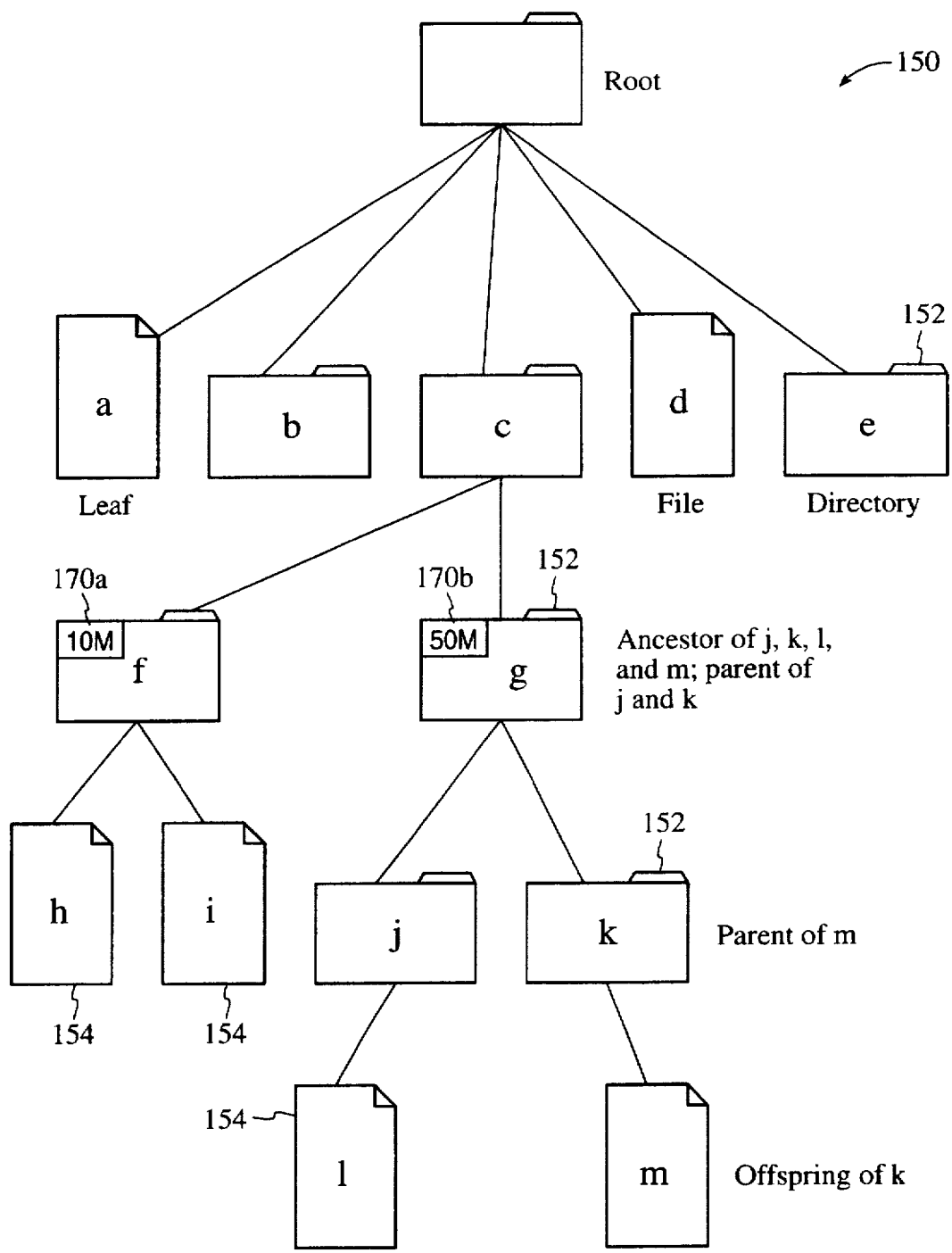
FIG. 7 is a block diagram illustrating a volume within a file server in which directory quotas have been assigned to specific directories.

FIG. 7 is a block diagram illustrating an example of directory quotas 170 assigned to specific directories 152 in a volume 150 within the file server. As shown, directory "f" has been assigned a directory quota of 10 MB, and directory "g" has been assigned a directory quota 170B of 50 MB.

Referring to FIGS. 6 and 7, the directory quotas 170 of the present invention ration how a hard drive is allocated and used by clients without requiring constant oversight by an administrator. By setting a maximum size for a directory 152, the administrator can be assured that the directory and all its' descendants will not grow beyond the limitations set.

In a preferred embodiment of the present invention, the maximum size chosen for a directory 152 can be up to the total size of the hard drive, and a directory 152 having a directory quota is not permitted to have an ancestor with a quota. Disallowing nested directories with quotas simplifies implementation by eliminating problems that could be caused if an ancestor were to have a smaller quota than one of its' descendants.

Once a directory quota is assigned to a directory 152, the file server 14 must track the size of the directory 152 to ensure that a violation of the quota does not occur. In order to do this, all calls from clients that add or remove items from a directory 152 are tracked. The calls not only include those that actually create or delete files 154, but also the calls that add and remove data from existing files 154.

Referring to FIGS. 3 and 6, when a client issues a requests to the file sever 14, the request is received by the ASP 130 and passed to the AFP 140 for processing. If the call is a request to write data to a specified directory 152, then before the write request can succeed, the server 14 must first determine if and where a quota exists.

To accomplish this, the AFP 140 performs a write function that determines if a directory quota 170 is assigned to the directory or an ancestor of a directory, and if so, whether or not the request exceeds the assigned directory quota 170. If the request does not violate the directory quota 170, the write function executes the request and returns a value of True (1) to indicate that the write occurred.

Figure 8:
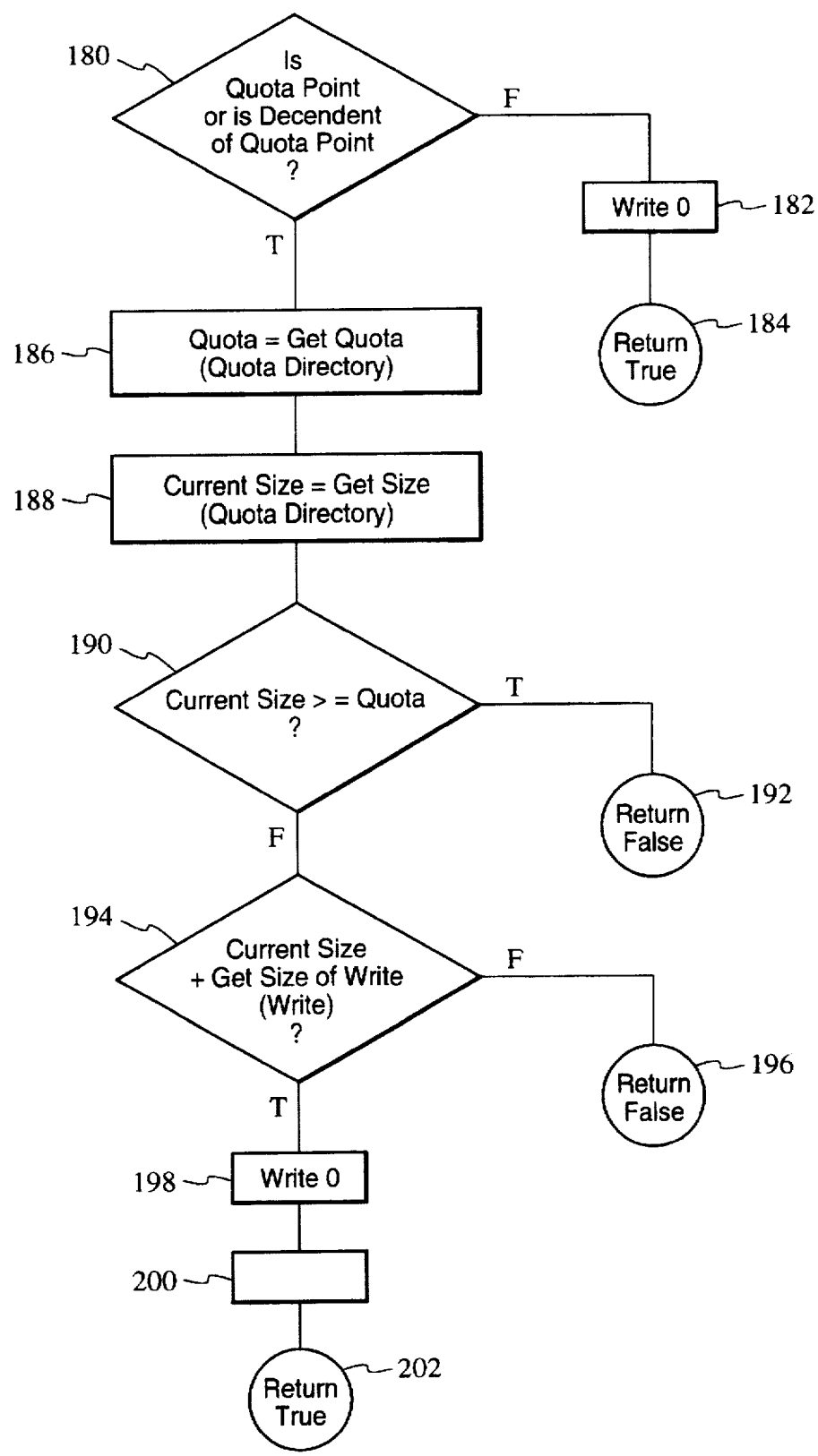
FIG. 8 is flow chart depicting the steps performed by a write request function of the AFP.

FIG. 8 is flow chart depicting the steps performed by the write request function of the AFP. The process begins in step 180 by determining whether the specified directory 152 has a directory quota 170 or is a descendant of a directory that has a directory quota 170.

In a preferred embodiment of the present invention, the protocol layers in AppleTalk are written as object oriented class structures in the C++ programming language. As is apparent to one with ordinary skill in the art, a class is an abstract description of both data and behavior of a collection of similar objects. The AFP 140 includes a FPDIR (File Pointer Directory) class structure that is used to store information related to directories, such a permissions and quotas. Therefore, step 180 is accomplished by checking quota point variables in the FPDIR class corresponding to the specified directory.

If the directory does not have an associated directory quota 170 in step 180, then the write is executed in step 182, and the write function returns True in step 184.

If the directory does have an associated directory quota 170, then the quota value is fetched from a quota-directory variable in step 186 and the current size of the directory is determined in step 188.

Next, the current size of the directory is compared with the directory quota in step 190. If the current size of the directory is greater than or equal to the directory quota (although the size should never be greater than the directory quota), then the function returns False (0) in step 192.

If the current size of the directory is less than the directory quota, the it must be determined whether the current size of the directory plus the size of the data in the write request will exceed the quota in step 194.

If the current size of the directory plus the size of the write request exceeds the quota, then the function returns False (0) in step 196.

If the current size of the directory plus the size of the write request does not exceed the quota, then the write is executed in step 198. The size of the directory is then updated to include the size of the data in the write in step 200, and the write function returns True in step 202.

A directory quota method and system has been disclosed that establishes and enforces a maximum size for a directory without requiring constant oversight by workgroup administrators. Software written according to the present invention is intended to reside in some form of computer readable medium, such as memory or disk, or communicated via a network.

Although the present invention has been described in accordance with the embodiments shown in the figures, one of ordinary skill in the art recognizes there could be variations to the embodiments and those variations would be within the spirit and scope of the present invention. For example, one with ordinary skill in the art will recognize that the present invention is not limited to the AppleTalk protocol or the Macintosh file system, but rather can be implemented with any type of network protocol and any type of file system. Accordingly, many modifications may be made by one of ordinary skills in the art without departing from the spirit and scope of present invention, the scope of which is defined by the appended claims.

We claim:

1. A computer-implemented method for establishing and enforcing a maximum size for a directory, the method comprising the steps of:

(a) setting a quota size for the directory;

(b) in response to a request to write data to the directory, determining if the size of the directory is less than the quota size;

(b1) denying the write request if the size of the directory is greater than the quota size;

(c) if the size of the directory is less than the quota size, determining if the write request will exceed the quota size; and (d) if the write request will not exceed the quota size, processing the write request, thereby preventing the size of the directory from exceeding the set quota size.

2. A method as in claim 1 wherein step (a) further includes the step of:

(a1) enabling only a network administrator to set the quota size.

3. A method as in claim 2 wherein step (c) further includes the step of:

(c1) comparing the current size of the directory plus the size of the data included in the write request to the quota size.

4. A method as in claim 3 wherein step (d) further includes the step of:

(d1) denying the write request if the current size of the directory plus the size of the data in the write request exceeds the quota size.

5. A workgroup network system including a plurality of network users connected to a file server, the file server including a directory, the workgroup administered by an administrator, the system including:

a first protocol for receiving a request to write data to the directory;

means for enabling the administrator to set a quota size for a directory;

means responsive to the request for determining if the size of the directory is less than the quota size;

means for determining if the write request will exceed the quota size when the size of the directory is less than the quota size;

means for denying the write request if the size of the directory is greater than the quota size; and means for processing the write request if the write request will not exceed the quota size, thereby enabling the administrator to establish and enforce a maximum size for the directory without requiring constant oversight.

6. A system as in claim 5 wherein the file server further includes an object oriented directory class structure that is used to store the directory quota and directory size information corresponding to each of the plurality of directories in the file server.

7. A system as in claim 6 wherein the file server includes a storage device having a volume.

8. A system as in claim 7 wherein the plurality of directories are volume arranged in a branching tree structure of directories and files within the volume.

9. A directory quota method for establishing and enforcing a maximum size for a directory on a file server by workgroup administrators without requiring constant oversight, the method comprising:

(a) receiving a request to write data in the directory;

(b) determining if a directory quota has been assigned to the directory;

(c) executing the write request if the directory has not been assigned a directory quota;

(d) if a directory quota has been assigned to the directory, then determining the current size of the directory;

(e) if the current size of the directory is less than the directory quota, determining if the current size of the directory plus the size of the data included in the write request exceeds the directory quota; and (f) executing the write request if the current size of the directory plus the size of the data included in the write request does not exceed the directory quota.

10. A method as in claim 9 wherein step (b) further includes the steps of:

(b2) providing a directory class structure in the file server that stores size and quota information corresponding to directories.

11. A method as in claim 10 wherein step (e) further includes the step of:

(e1) denying the write request if the current size of the directory is equal to or greater than the directory quota.

12. A method as in claim 11 wherein step (f) further includes the step of:

(f1) denying the write request if the current size of the directory plus the size of the data in the write request exceeds the directory quota.

13. A method as in claim 9, further comprising a step of (a1) determining that an ancestor directory quota does not exist prior to assigning a directory quota to a descendant.

14. A computer-readable medium containing program instructions for establishing and enforcing a maximum size for a directory, the program instructions for:

(a) setting a quota size for the directory;

(b) in response to a request to write data to the directory, determining if the size of the directory is less than the quota size;

(b1) denying the write request if the size of the directory is greater than the quota size;

(c) if the size of the directory is less than the quota size, determining if the write request will exceed the quota size; and (d) if the write request will not exceed the quota size, processing the write request, thereby preventing the size of the directory from exceeding the set quota size.

15. A computer-readable medium as in claim 14 wherein instruction (a) further includes an instruction for:
   (a1) enabling only a network administrator to set the quota size.

16. A computer-readable medium as in claim 15 wherein instruction (c) further includes an instruction for:
   (c1) comparing the current size of the directory plus the size of the data included in the write request to the quota size.

17. A computer-readable medium as in claim 16 wherein instruction (d) further includes an instruction for:
   (d1) denying the write request if the current size of the directory plus the size of the data in the write request exceeds the directory quota.

* * * * *